US011367449B2

(12) United States Patent
Song et al.

(10) Patent No.: US 11,367,449 B2
(45) Date of Patent: Jun. 21, 2022

(54) METHOD AND APPARATUS FOR CALLING VOICE RECOGNITION SERVICE BY USING BLUETOOTH LOW ENERGY TECHNOLOGY

(71) Applicant: LG ELECTRONICS INC., Seoul (KR)

(72) Inventors: Taeyoung Song, Seoul (KR); Jingu Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 169 days.

(21) Appl. No.: 16/637,713

(22) PCT Filed: Aug. 9, 2018

(86) PCT No.: PCT/KR2018/009093
§ 371 (c)(1),
(2) Date: Feb. 7, 2020

(87) PCT Pub. No.: WO2019/031870
PCT Pub. Date: Feb. 14, 2019

(65) Prior Publication Data
US 2020/0184977 A1 Jun. 11, 2020

Related U.S. Application Data

(60) Provisional application No. 62/542,814, filed on Aug. 9, 2017.

(51) Int. Cl.
*G10L 15/30* (2013.01)
*H04W 4/80* (2018.01)
*G10L 15/22* (2006.01)

(52) U.S. Cl.
CPC .............. *G10L 15/30* (2013.01); *G10L 15/22* (2013.01); *H04W 4/80* (2018.02)

(58) Field of Classification Search
CPC ..... G10L 15/30; G10L 15/22; G10L 2015/088; G10L 15/32; H04W 4/80
See application file for complete search history.

(56) References Cited

U.S. PATENT DOCUMENTS 9,818,407 B1 * 11/2017 Seeker-Walker ....... G10L 15/32
10,373,630 B2 * 8/2019 Ravindran .............. G10L 15/30
(Continued)

FOREIGN PATENT DOCUMENTS

JP         2016507079      3/2016
KR        20140054643      5/2014
(Continued)

OTHER PUBLICATIONS

PCT International Application No. PCT/KR2018/009093, International Search Report dated Jan. 25, 2019, 3 pages.
(Continued)

*Primary Examiner* — Abul K Azad
(74) *Attorney, Agent, or Firm* — Lee Hong Degerman Kang Waimey

(57) ABSTRACT

The present invention relates to a method and an apparatus for calling a voice recognition service by using Bluetooth low energy (LE). In particular, a method performed by a first device may comprise the steps of: receiving a first request message requesting start of a voice recognition service, from a second device connected to the first device through Bluetooth communication, wherein the first request message is generated by generation of a first wake word pre-configured in the second device; executing a voice gateway connected to multiple voice managers in response to the first request message; and executing a voice recognition service between the second device and a first voice manager determined by the voice gateway among the multiple voice managers.

8 Claims, 15 Drawing Sheets

(56) References Cited

U.S. PATENT DOCUMENTS

| | | | |
|---|---|---|---|
| 10,601,599 B2* | 3/2020 | Patel | G10L 15/22 |
| 2007/0143116 A1* | 6/2007 | De Armas | G06F 9/505 |
| | | | 704/270.1 |
| 2011/0295603 A1 | 12/2011 | Meisel | |
| 2014/0337022 A1* | 11/2014 | Liu | G10L 15/30 |
| | | | 704/231 |

FOREIGN PATENT DOCUMENTS

| | | |
|---|---|---|
| KR | 20150022786 | 3/2015 |
| WO | 2005010868 | 2/2005 |

OTHER PUBLICATIONS

PCT International Application No. PCT/KR2018/009093, International Searching Report dated Nov. 28, 2018, 3 pages.

\* cited by examiner

[FIG. 1]
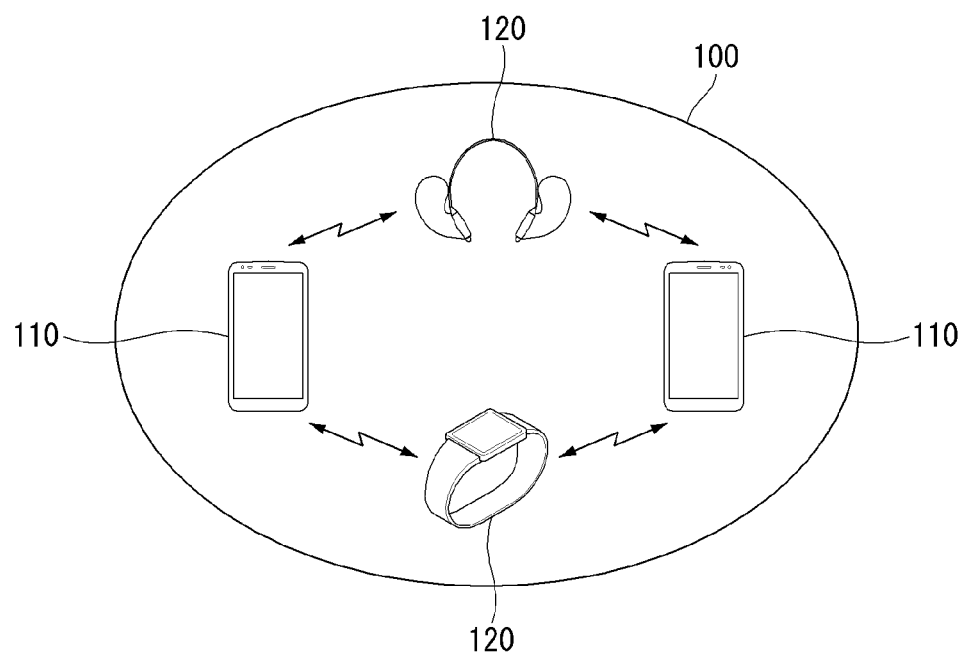

[FIG. 2]
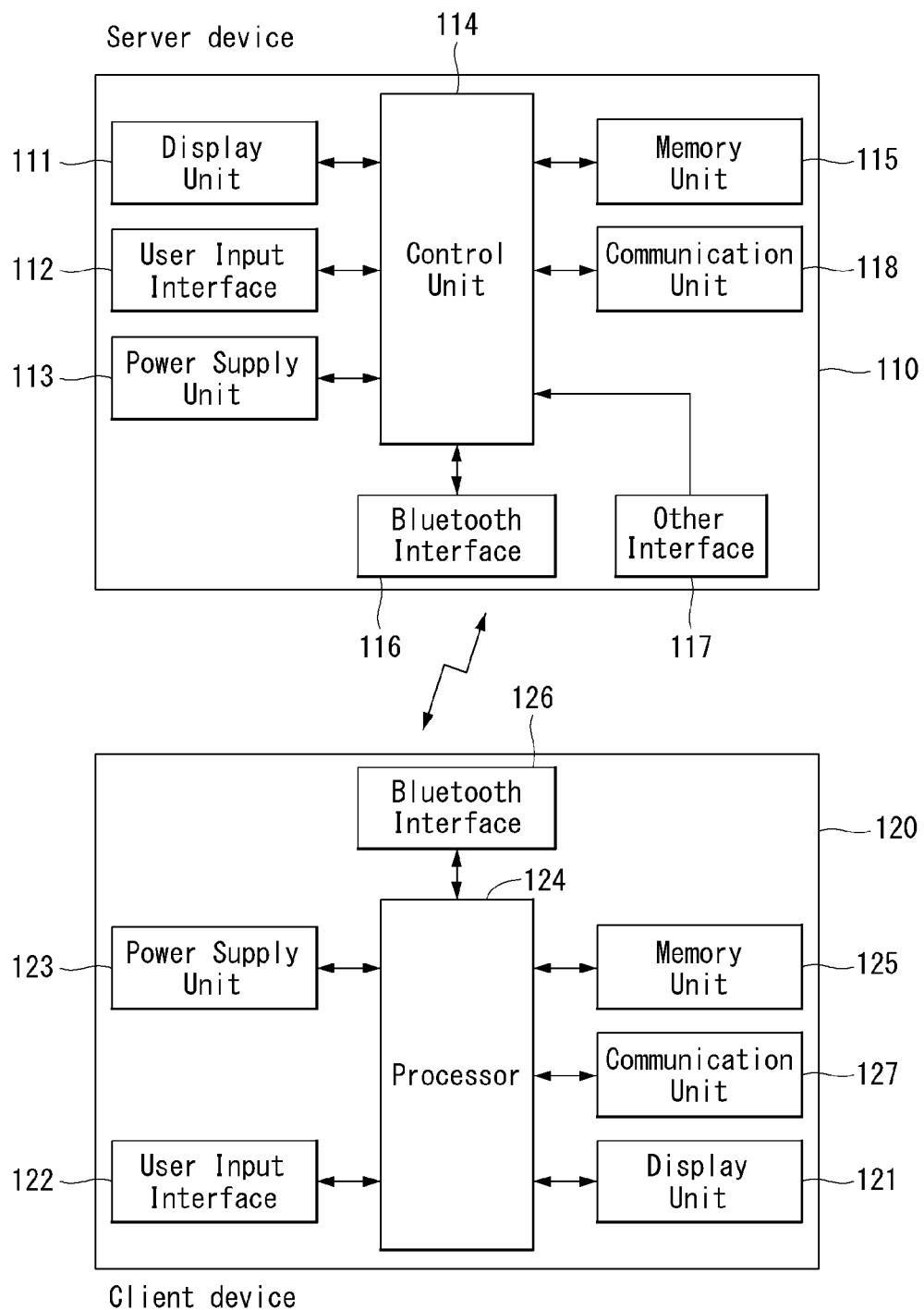

[FIG. 3]
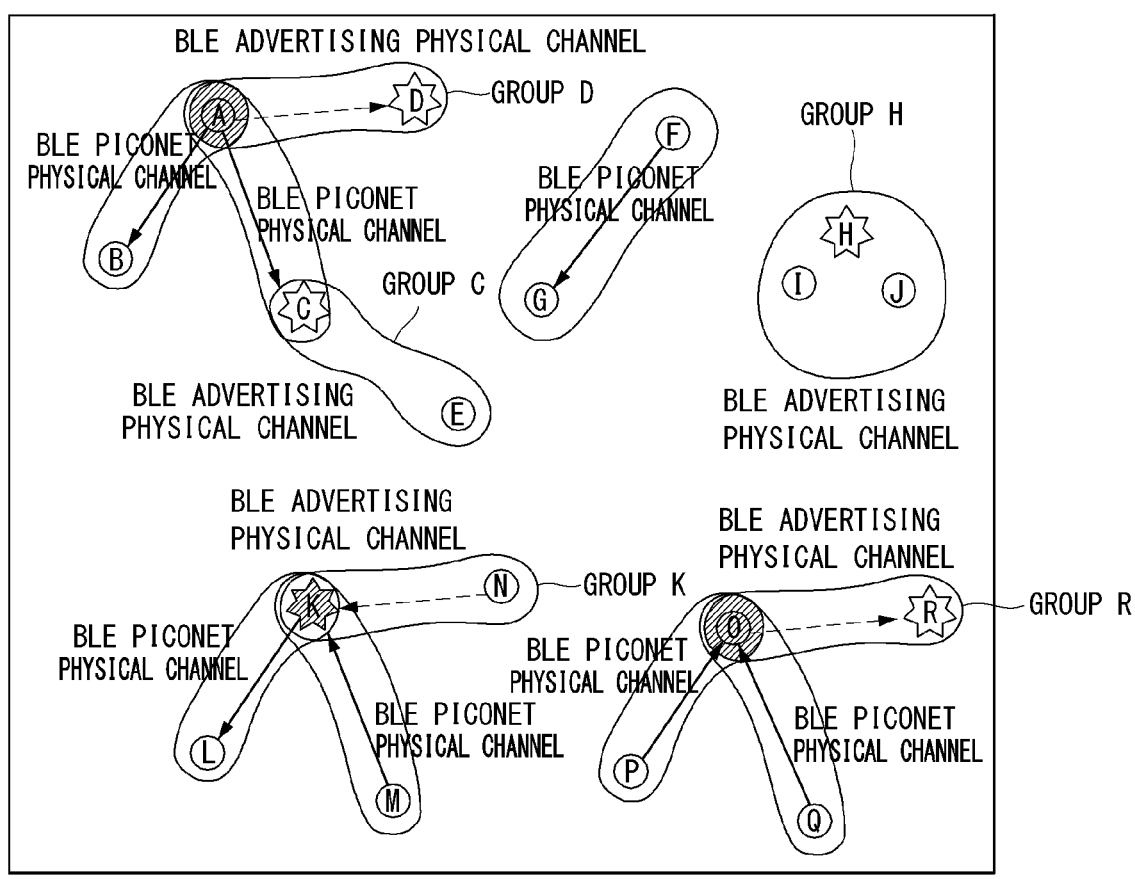

[FIG. 4]
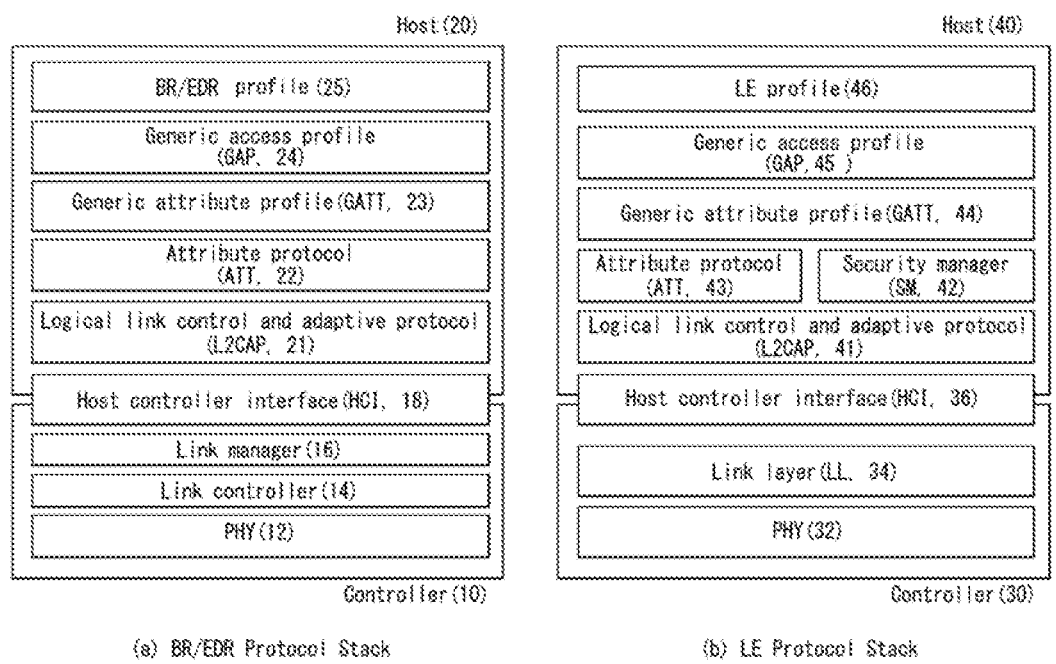
(a) BR/EDR Protocol Stack
(b) LE Protocol Stack

[FIG. 5]
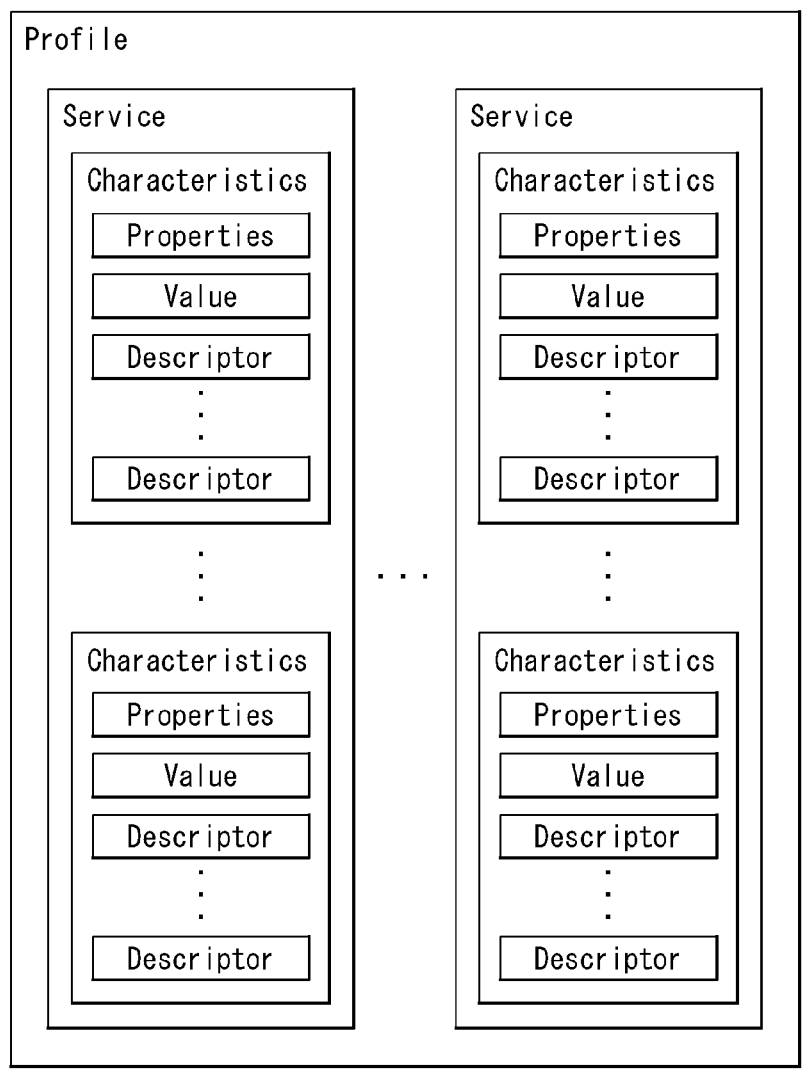

[FIG. 6]
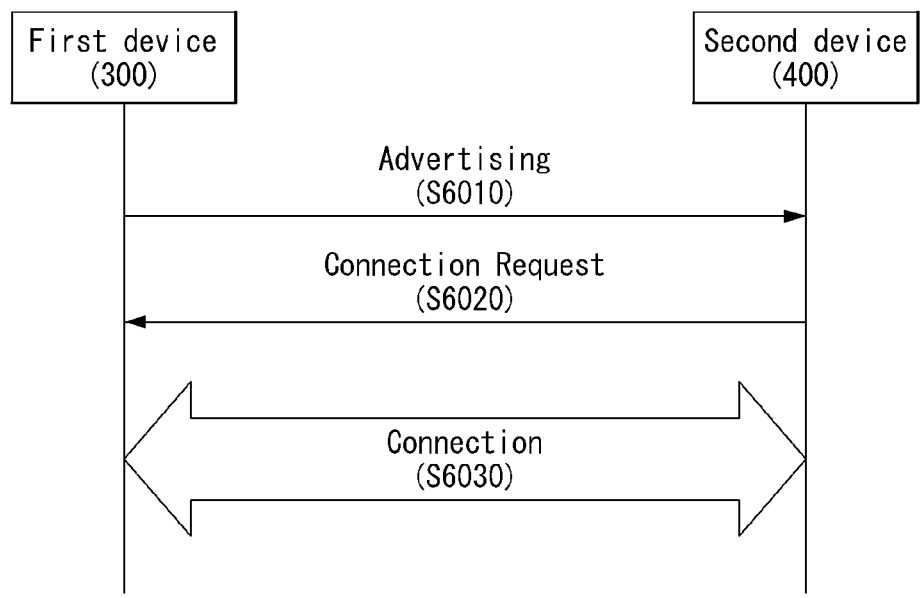

[FIG. 7]
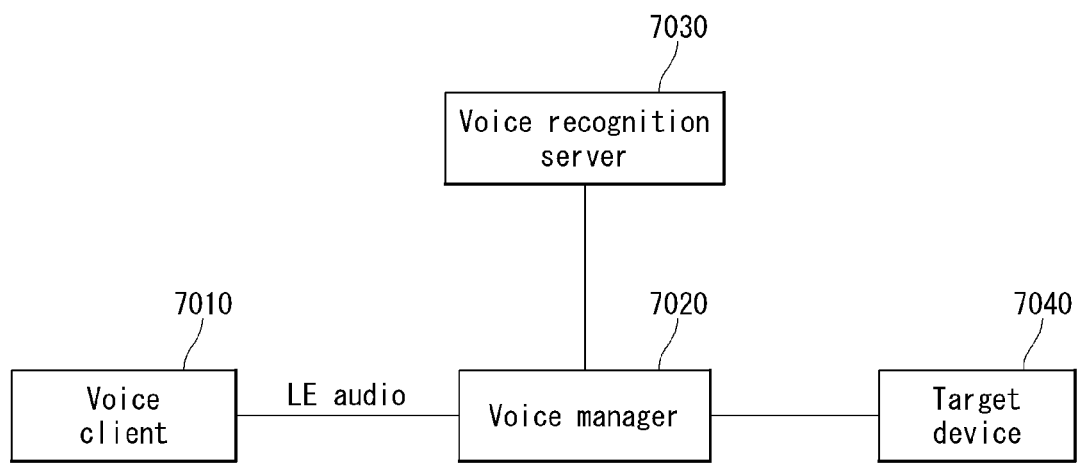

[FIG. 8]
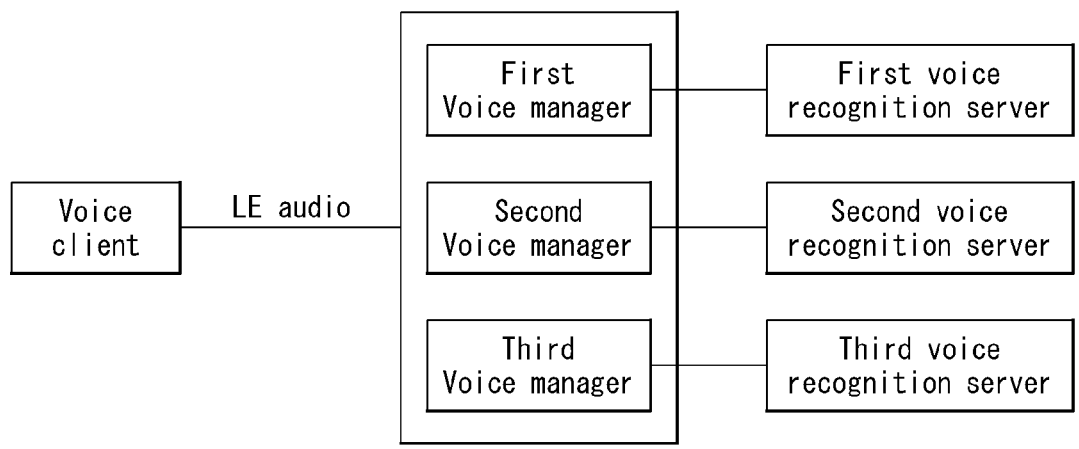

[FIG. 9]
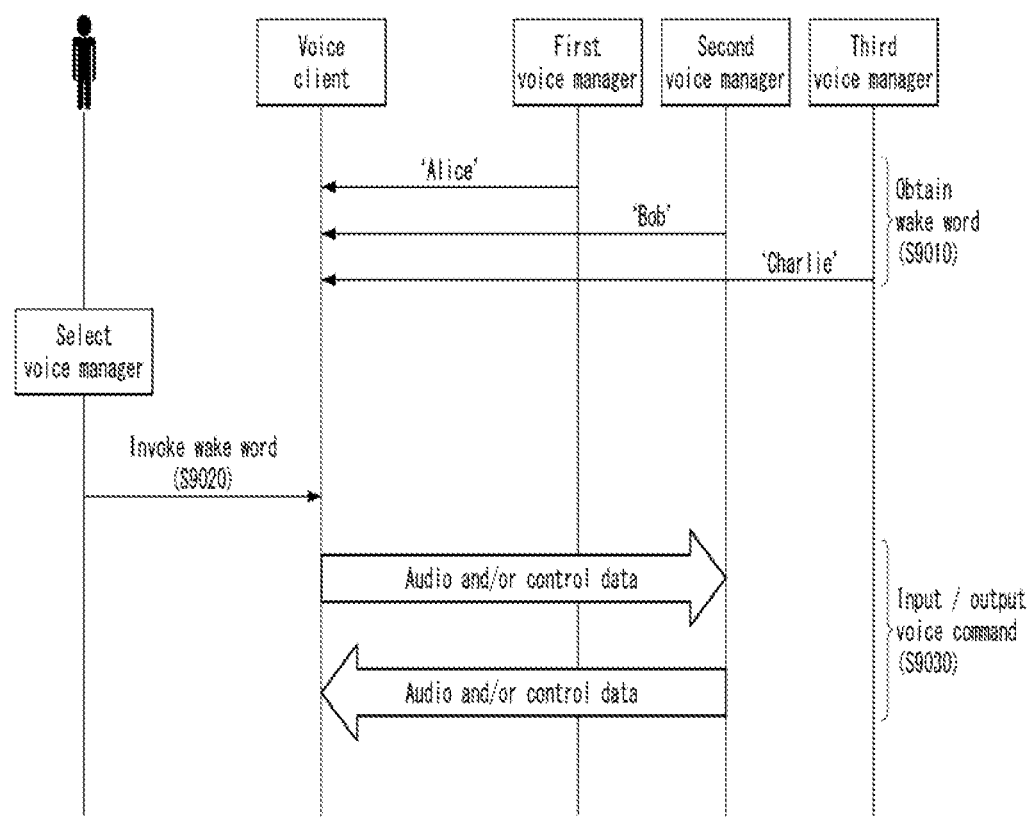

[FIG. 10]
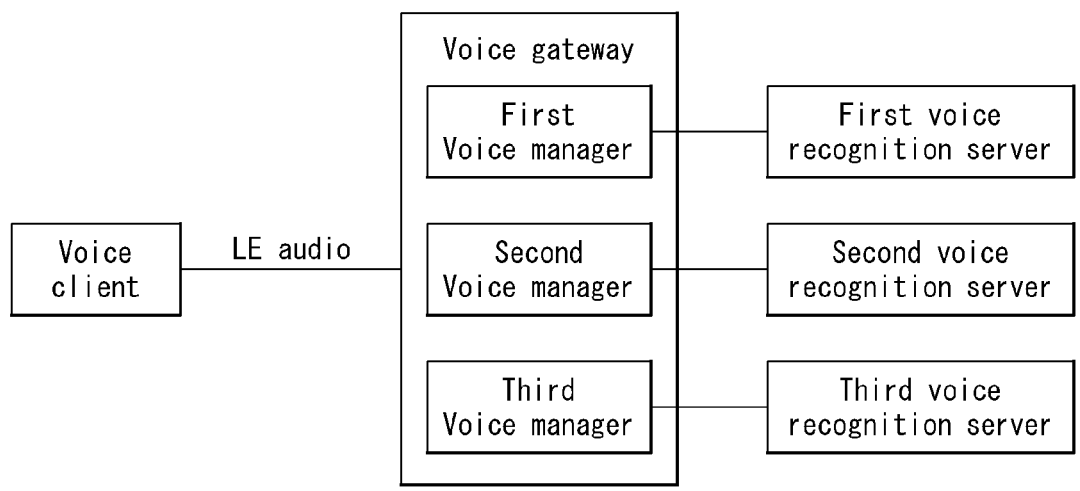

[FIG. 11]
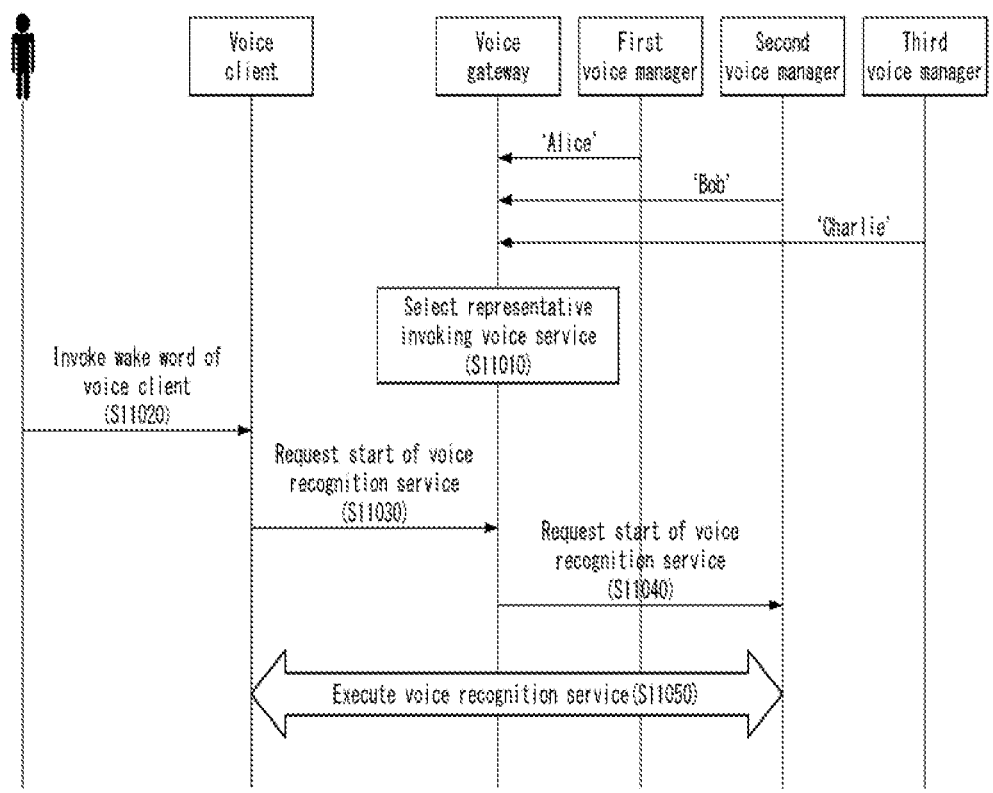

[FIG. 12]
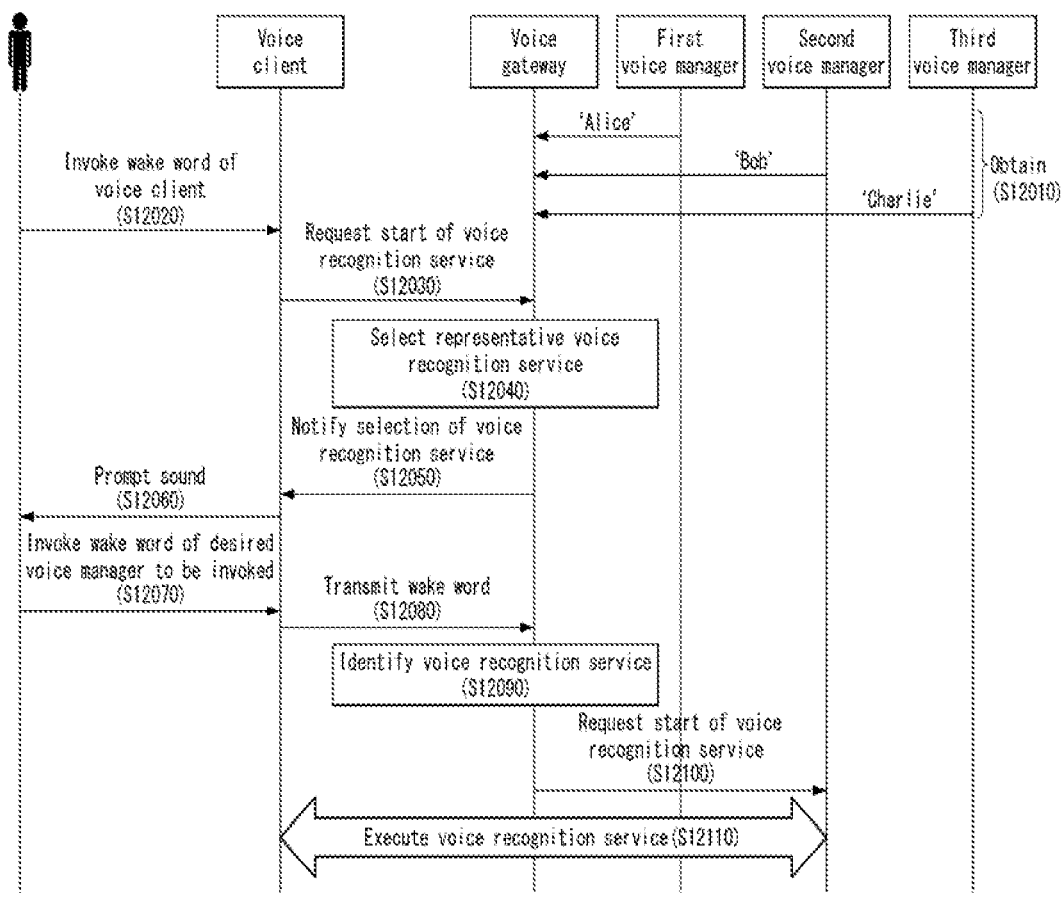

[FIG. 13]
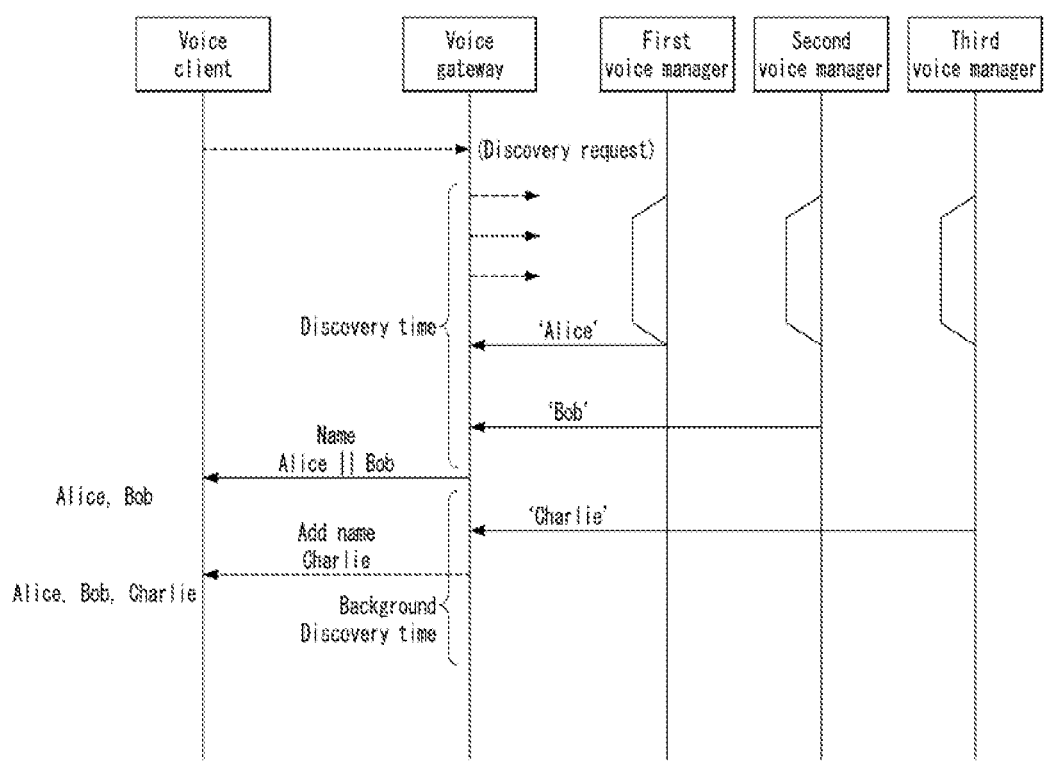

[FIG. 14]
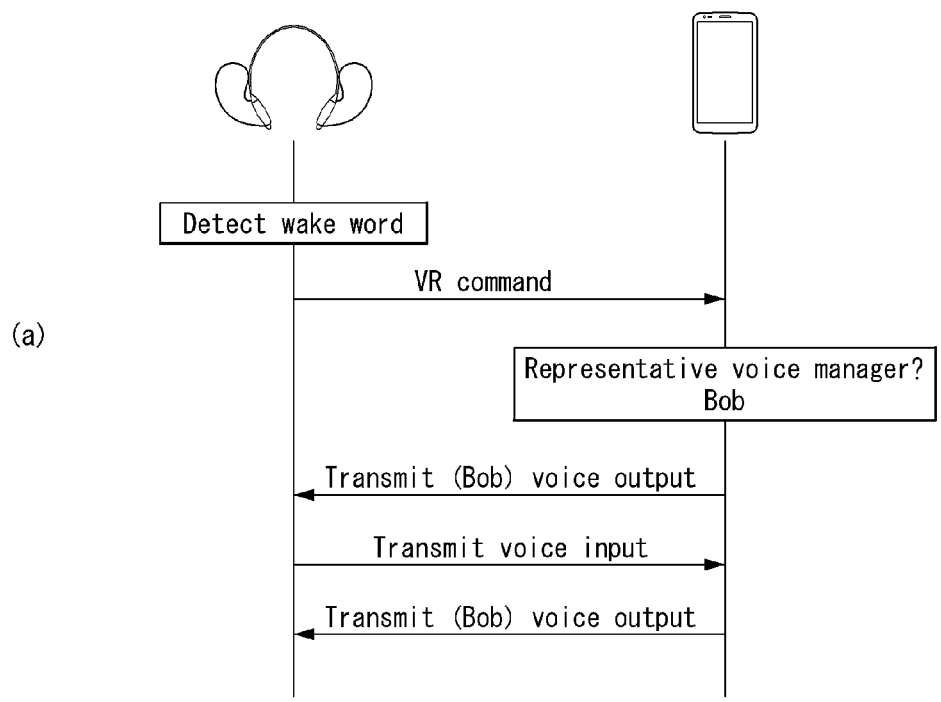
(a)
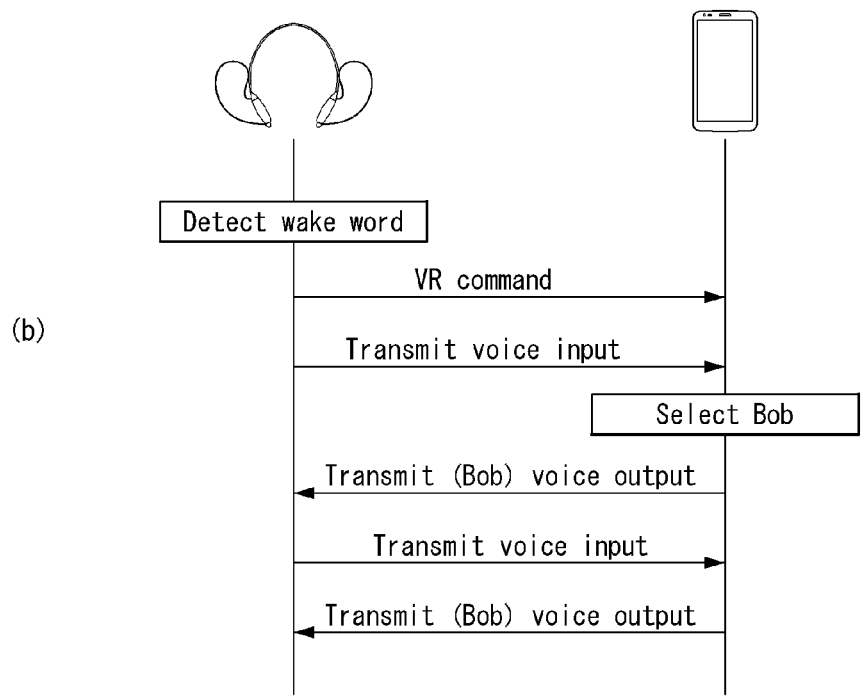
(b)

[FIG. 15]
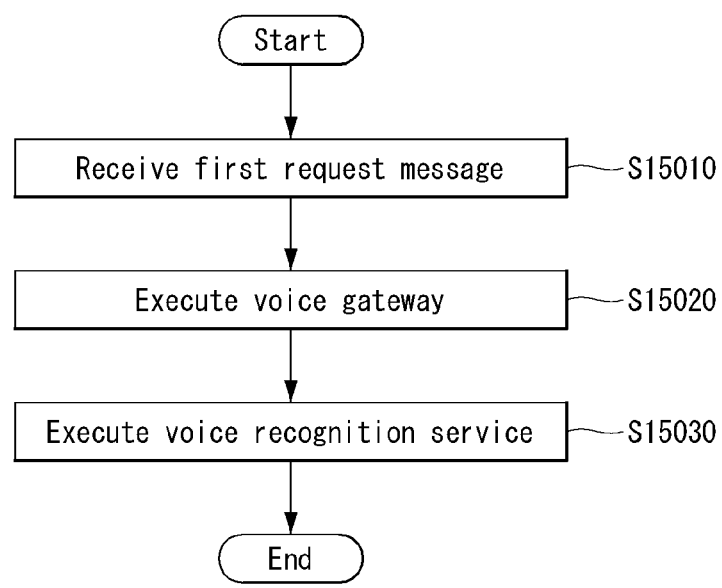

METHOD AND APPARATUS FOR CALLING VOICE RECOGNITION SERVICE BY USING BLUETOOTH LOW ENERGY TECHNOLOGY

CROSS-REFERENCE TO RELATED APPLICATIONS

This application is the National Stage filing under 35 U.S.C. 371 of International Application No. PCT/KR2018/009093, filed on Aug. 9, 2018, which claims the benefit of U.S. Provisional Application No. 62/542,814 filed on Aug. 9, 2017, the contents of which are all hereby incorporated by reference herein in their entirety.

TECHNICAL FIELD

The present disclosure relates to a method and apparatus for invoking a voice recognition service using Bluetooth, that is, a short-distance technology, in a wireless communication system and, more particularly, to a method and apparatus for invoking a voice recognition service between devices using a Bluetooth low energy (BLE) technology.

BACKGROUND ART

Bluetooth is an NFC technology standard allowing various devices to be wirelessly connected in a near field to exchange data. In a case in which two devices intend to perform wireless communication using Bluetooth communication, a user may perform a procedure for discovering a Bluetooth device with which he or she wants to communicate and requesting a connection. In the present disclosure, a device may refer to an apparatus or an appliance.

Here, the user may discover a Bluetooth device according to a Bluetooth communication method intended to be used using the Bluetooth device, and subsequently perform a connection.

The Bluetooth communication method may be classified as a BR/EDR method and an LE method. The BR/EDR method may be termed Bluetooth Classic. The Bluetooth Classic method includes a Bluetooth technology led from Bluetooth 1.0 and a Bluetooth technology using an enhanced data rate (EDR) supported by Bluetooth 2.0 or a subsequent version.

A Bluetooth low energy (LE) technology applied, starting from Bluetooth 4.0, may stably provide information of hundreds of kilobytes (KB) at low power consumption. Such a Bluetooth low energy technology allows devices to exchange information with each other by utilizing an attribute protocol. The Bluetooth LE method may reduce energy consumption by reducing overhead of a header and simplifying an operation.

Among the Bluetooth devices, some products do not have a display or a user interface. Complexity of connection, management, control, and disconnection among various types of Bluetooth devices and Bluetooth device employing similar technologies has increased.

Bluetooth supports a high speed at relatively low power consumption and at relatively low cost. However, since a transmission distance thereof is 100 m at the maximum, and thus, Bluetooth is appropriately used within a limited space.

DISCLOSURE

Technical Problem

Recently various services are used in the voice recognition service market, but only one service supported by a device (e.g., a smartphone or a home hub) connected to a remote device (e.g., a headset or a speaker) can be used in the remote device to which conventional Bluetooth communication is applied. Although a remove device is connected to a device that supports several voice recognition services, there is a problem in that the remote device must store all wake words for a plurality of voice recognition services because the remote device has an insufficient resource.

Accordingly, the disclosure proposes a method using a plurality of voice recognition services using a unique wake word configured in a remote device.

Technical objects to be achieved in the disclosure are not limited to the aforementioned technical objects, and other technical objects not described above may be evidently understood by a person having ordinary skill in the art to which the disclosure pertains from the following description.

Technical Solution

In an aspect of the disclosure, a method performed by a first device in order to invoke a voice recognition service in a wireless communication system using a Bluetooth low energy technology may include receiving, from a second device connected to the first device through Bluetooth communication, a first request message to request the start of a voice recognition service, wherein the first request message is generated by the generation of a first wake word pre-configured in the second device, executing a voice gateway connected to a plurality of voice managers as a response to the first request message, and executing the voice recognition service between the second device and a first voice manager determined by the voice gateway among the plurality of voice managers.

Preferably, executing the voice recognition service may include executing a voice recognition service between the second device and the first voice manager pre-configured in the voice gateway, among the plurality of voice managers.

Preferably, executing the voice recognition service may include receiving, from the second device, a second wake word corresponding to any one of the plurality of voice managers, and executing a voice recognition service between the second device and the first voice manager corresponding to the second wake word.

Preferably, executing the voice recognition service may include obtaining, from the plurality of voice managers, wake words corresponding to the plurality of voice managers, respectively.

Preferably, executing the voice recognition service may further include transmitting, to the second device, a second request message to request a selection of a specific voice recognition service of voice recognition services supported by the plurality of voice managers.

Preferably, executing the voice recognition service may further include transmitting, by the voice gateway, a third request message to request the execution of the voice recognition service to the first voice manager corresponding to the second wake word.

Preferably, the method may further include receiving, from the second device, a voice command related to the voice recognition service supported by the first voice manager.

Preferably, the method may further include transmitting, to the second device, a voice output signal related to the voice recognition service supported by the first voice manager.

In another aspect of the disclosure, a first device in a method of invoking a voice recognition service in a wireless communication system using a Bluetooth low energy technology includes a communication unit for transmitting or receiving a signal to or from an external device in a wired and/or wireless manner and a processor functionally connected to the communication unit. The processor may be configured to receive, from a second device connected to the first device through Bluetooth communication, a first request message to request the start of a voice recognition service, wherein the first request message is generated by the generation of a first wake word pre-configured in the second device, execute, as a response to the first request message, a voice gateway connected to a plurality of voice managers, and execute the voice recognition service between the second device and a first voice manager determined by the voice gateway among the plurality of voice managers.

Advantageous Effects

According to an embodiment of the disclosure, a remote device supporting Bluetooth LE audio can select and use a plurality of voice recognition services.

Effects which may be obtained in the disclosure are not limited to the aforementioned effects, and other technical effects not described above may be evidently understood by a person having ordinary skill in the art to which the disclosure pertains from the following description.

DESCRIPTION OF DRAWINGS

FIG. 1 is a schematic view illustrating an example of a wireless communication system using a Bluetooth low energy technology proposed in this specification.

FIG. 2 illustrates an example of an internal block diagram of a device in which methods proposed in the disclosure may be implemented.

FIG. 3 is a view illustrating an example of a Bluetooth low energy topology.

FIG. 4 is a view illustrating an example of a Bluetooth communication architecture proposed in this specification.

FIG. 5 illustrates one example of an internal block diagram of a device which may implement methods proposed by this specification.

FIG. 6 is a flowchart illustrating a method of forming a connection using Bluetooth low energy (LE) between devices.

FIG. 7 is a diagram illustrating a block diagram of a voice recognition service system according to an embodiment of the disclosure.

FIG. 8 is a diagram for describing a problem occurring in the existing voice recognition service.

FIG. 9 is a diagram for describing a problem occurring in the existing voice recognition service.

FIG. 10 is a diagram illustrating a block diagram of a voice recognition service system according to an embodiment of the disclosure.

FIG. 11 is an embodiment to which the disclosure is applied and is a diagram for describing a method of invoking any one of a plurality of voice recognition services through Bluetooth LE communication.

FIG. 12 is an embodiment to which the disclosure is applied and is a diagram for describing a method of invoking any one of a plurality of voice recognition services through Bluetooth LE communication.

FIG. 13 is an embodiment to which the disclosure is applied and is a diagram for describing a method of discovering a plurality of voice recognition services and obtaining a wake word.

FIG. 14 is an embodiment to which the disclosure is applied and is a diagram for describing a method of invoking any one of a plurality of voice recognition services through Bluetooth LE communication.

FIG. 15 is an embodiment to which the disclosure is applied and is a diagram for describing a method of invoking any one of a plurality of voice recognition services through Bluetooth LE communication.

MODE FOR INVENTION

The aforementioned objects, features and advantages of the present invention will become more apparent through the following detailed description with respect to the accompanying drawings. Hereinafter, the embodiments of the present invention will be described with reference to the accompanying drawings, in which like numbers refer to like elements throughout the specification. In describing the present invention, a detailed description of known techniques associated with the present invention unnecessarily obscure the gist of the present invention, it is determined that the detailed description thereof will be omitted.

Hereinafter, a terminal related to the present invention will be described in detail with reference to the accompanying drawings. In the following description, usage of suffixes such as 'module', 'part' or 'unit' used for referring to elements is given merely to facilitate explanation of the present invention, without having any significant meaning by itself.

Electronic devices in this document may include a cellular phone, smartphone, laptop computer, digital broadcasting terminal, personal digital assistants (PDA), portable multimedia player (PMP), navigation terminal, and temperature/barometer/biometric data sensor; however, it should be clearly understood by those skilled in the art that except for those specific cases applicable only to a mobile terminal, the structure according to the embodiments of the present invention can also be applied to fixed terminals such as a digital TV and a desktop computer.

A signal described in this document can be transmitted in the form of not only a message but also a frame. A wireless communication interface and a wireless communication means are assigned or used interchangeably by taking into account only the convenience of writing the specification of the present invention and do not have individual implications or provide individual roles that can be distinguished from each other.

FIG. 1 is a schematic view illustrating an example of a wireless communication system using a Bluetooth low energy technology proposed in this specification.

A wireless communication system 100 includes at least one server device 120 and at least one client device 110.

The server device and the client device perform Bluetooth communication using a Bluetooth low energy (BLE) technology.

First, compared with a Bluetooth basic rate/enhanced data rate (BR/EDR), the BLE technology has a relatively small duty cycle, may be produced at low cost, and significantly reduce power consumption through a low data rate, and thus, it may operate a year or longer when a coin cell battery is used.

Also, in the BLE technology, an inter-device connection procedure is simplified and a packet size is designed to be small compared with the Bluetooth BR/EDR technology.

In the BLE technology, (1) the number of RF channels is forty, (2) a data rate supports 1 Mbps, (3) topology has a scatternet structure, (4) latency is 3 ms, (5) a maximum current is 15 mA or lower, (6) output power is 10 mW (10 dBm) or less, and (7) the BLE technology is commonly used in applications such as a clock, sports, healthcare, sensors, device control, and the like.

The server device 120 may operate as a client device in a relationship with other device, and the client device may operate as a server device in a relationship with other device. That is, in the BLE communication system, any one device may operate as a server device or a client device, or may operate as both a server device and a client device if necessary.

The server device 120 can be denoted as a data service device, slave device, slave, server, conductor, host device, gateway, sensing device, monitoring device, or first device; and the client device 110 can be denoted as a master device, master, client, member, sensor device, sink device, audio sink device, collector, second device or third device.

The server device and the client device correspond to major components of the wireless communication system, and the wireless communication system may include components other than the server device and the client device.

The server device refers to a device which receives data from the client device and provides data to the client device in response when a corresponding request is received from the client device, through direct communication with the client device.

Also, in order to provide data information to the client device, the server device sends a notification message or an indication message to the client device in order to provide data information to the client device. Also, the server device receives a confirmation message corresponding to the indication message from the client device.

Also, in the process of transmitting and receiving notification, indication, and confirmation messages to and from the client device, the server device may provide data information to a user through a display unit or may receive a request input from the user through a user input interface.

Also, in the process of transmitting and receiving message to and from the client device, the server device may read data from a memory unit or may write new data to the corresponding memory unit.

Also, the single server device may be connected with a plurality of client devices, and may be easily re-connected with client devices using bonding information.

The client device 120 refers to a device which requests data information and data transmission from the server device.

The client device receives data through a notification message or an indication message from the server device, and when an indication message is received from the server device, the client device sends an acknowledgement message in response to the indication message.

Similarly, in the process of transmitting and receiving messages to and from the server device, the client device may also provide information to the user through a display unit or may receive an input from the user through a user input interface.

Also, in the process of transmitting and receiving messages with the server device, the client device may read data from a memory unit or may write new data to the corresponding memory unit.

Hardware components such as the display units, the user input interfaces, and the memory units of the server device and the client device will be described in detail with reference to FIG. 5.

Also, the wireless communication system may configure personal area networking (PAN) through the Bluetooth technology. For example, in the wireless communication system, a private piconet may be established between devices to quickly and safely exchange files, documents, and the like.

Furthermore, there are many apparatuses for measuring a human's physical activities using a specific device, but there is no apparatus for showing, to a user, a detailed data numerical value by transmitting measured data through Bluetooth.

Accordingly, in order to solve such a problem, the disclosure proposes a method of measuring a human's physical activities, processing measured data, and providing a user with the measured data by transmitting the measured data through Bluetooth LE.

FIG. 2 illustrates an example of an internal block diagram of a device in which methods proposed in the disclosure may be implemented.

As shown in FIG. 2, a server device includes a display unit 111, a user input interface 112, a power supply unit 113, a processor 114, a memory unit 115, a Bluetooth interface 116, other Interface 117 and a communication unit (or transceiver) 118.

The display unit 111, the user input interface 112, the power supply unit 113, the processor 114, the memory unit 115, Bluetooth interface 116, other interface 117 and the communication unit 118 are functionally connected to perform a method proposed in the disclosure.

Furthermore, a client device includes a display unit 121, a user input interface 122, a power supply unit 123, a processor 124, a memory unit 125, a Bluetooth interface 126 and a communication unit (or transceiver) 127.

The display unit 121, the user input interface 122, the power supply unit 123, the processor 124, the memory unit 125, Bluetooth interface 126, and the communication unit 127 are functionally connected to perform a method proposed in the disclosure.

The Bluetooth interface 116, 126 refers to a unit (or module) capable of a request/response, command, notification, indication/confirm message, etc. or data transmission between devices using the Bluetooth technology.

The memory unit 115, 125 is a unit implemented in various types of devices, and refers to a unit in which various data is stored.

The processor 114, 124 refers to a module for controlling an overall operation of the server device or the client device, and it requests the transmission of a message and processes a received message through the Bluetooth interface and other interface.

The processor 114, 124 may be represented as a processor, a control unit or a controller.

The processor 114, 124 may include application-specific integrated circuits (ASICs), other chipsets, logic circuits and/or data processors.

The processor 114, 124 controls the communication unit to receive an advertising message from the server device, controls the communication unit to transmit a scan request message to the server device and to receive a scan response message from the server device as a response to the scan request, and controls the communication unit to transmit a Connect Request message to the server device for a Bluetooth connect configuration with the server device.

Furthermore, after a Bluetooth LE connection is formed through the connection procedure, the processor 114, 124 controls the communication unit to read data from the server device or write data using an attribute protocol.

The memory unit 115, 125 may include a read-only memory (ROM), a random access memory (RAM), a flash memory unit, a memory unit card, a storage medium and/or other storage devices.

The communication unit 118, 127 may include a baseband circuit for processing a radio signal. When an embodiment is implemented in a software form, the aforementioned scheme may be implemented as a module (process, function, etc.) for performing the aforementioned function. The module may be stored in the memory unit and executed by the processor.

The memory unit 115, 125 may be positioned inside or outside the processor 114, 124, and may be connected to the processor 114, 124 by various well-known means.

The display unit 111, 121 refers to a module for providing a user with state information and message exchange information of the device through a screen.

The power supply unit 113, 123 refers to a module for receiving external power or internal power and supplying required power to each of the elements under the control of the processor.

As described above, the BLE technology has a small duty cycle and can significantly reduce power consumption through a low data transfer rate. Accordingly, the power supply unit can supply required power to each of the elements even with low output power (10 mW (10 dBm) or less).

The user input interface 112, 122 refers to a module for enabling a user to control an operation of the device by providing the processor with a user input, such as a screen button.

FIG. 3 is a view illustrating an example of a Bluetooth low energy topology.

Referring to FIG. 3, a device A corresponds to a master in a piconet (piconet A, the shaded portion) having a device B and a device C as slaves.

Here, the piconet refers to an aggregation of devices in which any one of them is a mater and the other devices occupy a shared physical channel connected to the master device.

The BLE slave does not share a common physical channel with the master. Each of the slaves communicates with the master trough a separate physical channel. There is another piconet (piconet F) having a master device F and a slave device G.

A device K is present in a scatternet K. Here, the scatternet refers to a group of piconets connected to other piconets.

The device K is a master of a device L and a slave of a device M.

A device O is also in the scatter net O. The device O is a slave of a device P and a slave of a device Q.

As illustrated in FIG. 2, five different device groups are present.

1. Device D is an advertiser and device A is an initiator (group D).
2. Device E is a scanner and Device C is an advertiser (group C).
3. Device H is an advertiser, and devices I and J are scanners (group H).
4. Device K is also an advertiser, and device N is an initiator (group K).
5. Device R is an advertiser, and device O is an initiator (group R).

The devices A and B use a single BLE piconet physical channel.

The devices A and C use another BLE piconet physical channel.

In group D, the device D advertises using an advertisement event connectable in an advertisement physical channel, and the device A is an initiator. The device A may establish a connection with the device D and add a device to the piconet A.

In group C, the device C advertises on an advertisement physical channel by using a certain type of an advertisement event captured by the scanner device E.

The group D and the group C may use different advertisement physical channels or different times in order to avoid collision.

In the piconet F, a single physical channel is present. The devices F and G use a single BLE piconet physical channel. The device F is a master, and the device G is a slave.

In group H, a single physical channel is present. The devices H, I, and J use a single BLE advertisement physical channel. The device H is an advertiser, and the devices I and J are scanners.

In the scatternet K, the devices K and L use a single BLE piconet physical channel. The devices K and M use another BLE piconet physical channel.

In group K, the device K advertises by using an advertisement event connectable on an advertisement physical channel, and the device N is an initiator. The device N may establish a connection with the device K. Here, the device K may be a slave of two devices and a master of one device at the same time.

In the scatternet O, the devices O and P use a single BLE piconet physical channel. The devices O and Q use another BLE piconet physical channel.

In group R, the device R advertises by using an advertisement event connectable on an advertisement physical channel, and the device O is an initiator. The device O may establish a connection with the device R. Here, the device O may be a slave of two devices and a master of one device at the same time FIG. 4 is a view illustrating an example of a Bluetooth communication architecture proposed in this specification.

With reference to FIG. 4, FIG. 4(*a*) illustrates one example of protocol stack of Bluetooth BR (Basic Rate)/ EDR (Enhanced Data Rate), and FIG. 4(*b*) illustrates one example of a protocol stack of Bluetooth LE (Low Energy).

In detail, as illustrated in (a) of FIG. 4, the Bluetooth BR/EDR protocol stack may include an upper controller stack 10 and a lower host stack 20 with respect to a host controller interface (HCI) 18.

The host stack (or host module) 20 refers to hardware for transmitting or receiving a Bluetooth packet to and from a wireless transceiver module receiving a Bluetooth signal of 2.4 GHz, and is connected to a Bluetooth module, the controller stack 10, to control the Bluetooth module and performs an operation.

The host stack 20 may include a BR/EDR PHY layer 12, a BR/EDR baseband layer 14, and a link manager 16.

The BR/EDR PHY layer 12 is a layer transmitting and receiving a 2.4 GHz wireless signal, and in case of using Gaussian frequency shift keying (GFSK) modulation, the BR/EDR PHY layer 12 may transmit data by hopping 79 RF channels.

The BR/EDR baseband layer 14 serves to transmit a digital signal, selects a channel sequence hopping 1400 times per second, and transmits a time slot having a length of 625 us for each channel.

The link manager layer 16 controls a general operation (link setup, control, security) of a Bluetooth connection by utilizing a link manager protocol (LMP).

The link manager layer 16 may perform the following functions.

- The link manager layer 16 may perform ACL/SCO logical transport, logical link setup, and control
- Detach: The link manager layer 16 stops connection and informs a counterpart device about the reason for stopping connection.
- The link manager layer 16 performs power control and role switch.
- The link manager layer 16 performs security (authentication, pairing, encryption) function.

The host controller interface layer 18 provides the interface between the Host module and the Controller module to allow the host to provide the command and the data to the controller and the controller to provide the event and the data to the host.

The host controller interface layer 18 provides the interface between the Host module and the Controller module to allow the host to provide the command and the data to the controller and the controller to provide the event and the data to the host.

The host stack (alternatively, host module 20) includes a logic link control and adaptation protocol (L2CAP) 21, a security manager (SM) 22, attribute protocol 23, generic attribute profile (GATT) 24a generic access profile (GAP) 25, and a BR/EDR profile 26.

The logic link control and adaptation protocol (L2CAP) 21 may provide one bidirectional channel for transmitting the data to a specific protocol or profile.

The L2CAP 21 may multiplex various protocols, profiles, and the like provided in a higher Bluetooth layer.

The L2CAP of the Bluetooth BR/EDR uses a dynamic channel, supports a protocol service multiplexer, retransmission, and a streaming mode, and provides segmentation, reassembly, per-channel flow control, and error control.

The security manager (SM) 22 is a protocol for authenticating a device and providing a key distribution.

The generic attribute profile (GATT) 24 may operate as a protocol that describes how the attribute protocol (ATT) 23 is used when services are configured. For example, the GATT 24 may operate to define how ATT attributes are grouped into services, and may operate to describe characteristics associated with services.

Accordingly, the GATT 24 and the ATT 23 may use characteristics in order to describe the state and services of a device and to describe how the characteristics are associated and used.

The attribute protocol 23 and the profiles 26 define a service (profile) using the Bluetooth BR/EDR and define an application protocol for transmitting and receiving the data and the generic access profile (GAP) 25 defines a scheme that discovers the device, connects the device, and provides information to the user and provides privacy.

As illustrated in FIG. 4(b), the Bluetooth LE protocol stack includes a controller stack 30 which is operable to process a wireless device interface of which a timing is important and a host stack 40 which is operable to process high-level data.

First, the controller stack 30 may be implemented by using a communication module which may include a Bluetooth wireless apparatus, for example, a processor module which may include a processing device such as a microprocessor.

The host stack may be implemented as a part of an OS which operates on the processor module or instantiation of a package above the OS.

In some cases, the controller stack and the host stack may be actuated or executed on the same processing device in the processor module.

The controller stack 30 includes a physical layer (PHY) 32, a link layer 34, and a host controller interface 36.

The physical layer (PHY) (wireless transceiving module) 32 as a layer that transceives a 2.4 GHz wireless signal uses Gaussian frequency shift keying (GFSK) modulation and a frequency hopping technique constituted by 40 RF channels.

The link layer 34 that serves to transmit or receive a Bluetooth packet performs advertising and scanning functions by using three advertising channels and thereafter, provides functions to generate a device-to-device connection and transmit and receive a data packet of a maximum of 257 bytes through 37 data channels.

The host stack may include a generic access profile (GAP) 40, a logic link control and adaptation protocol (L2CAP) 41, a security manager (SM) 42, an attribute protocol (ATT) 440, a generic attribute profile (GATT) 44, a generic access profile 25, and an LT profile 46. However, the host stack 40 is not limited thereto and the host stack 40 may include various protocols and profiles.

The host stack may multiplex various protocols, profiles, and the like provided in the higher Bluetooth layer by using the L2CAP.

First, the logic link control and adaptation protocol (L2CAP) 41 may provide one bidirectional channel for transmitting the data to a specific protocol or profile.

The L2CAP 41 is operable to multiplex the data among higher layer protocols, segment and reassemble packages, and manage multicast data transmission.

In the Bluetooth LE, three fixed channels (one for a signaling CH, one for the security manager, and one for the attribute protocol) are used.

On the contrary, in basic rate/enhanced data rate (BR/EDR), the dynamic channel is used and the protocol service multiplexer, the retransmission, the streaming mode, and the like are supported.

The security manager (SM) 42 is a protocol for authenticating the device and providing key distribution.

The attribute protocol (ATT) 43 defines a rule for accessing data of a counter device in a server-client structure. The ATT includes six following message types (request, response, command, notification, indication, and confirmation).

① Request and Response message: a request message refers to the message used by a client device to request specific information from a server device, and a response message refers to the message transmitted by the server device to the client device in response to the request message.

② Command message: a message transmitted from a client device to a server device to command a specific operation. The server device does not transmit a response to the command message to the client device.

③ Notification message: It is a message transmitted from the server device to the client device in order to notify an event, or the like. The client device does not transmit a confirmation message with respect to the notification message to the server device.

④ Indication and confirmation message: It is a message transmitted from the server device to the client device in order to notify an event, or the like. Unlike the notification message, the client device transmits a confirmation message regarding the indication message to the server device.

The disclosure enables a client to clearly know a data length because a value of the data length is transmitted when long data is requested in a GATT profile using the ATT 43, and can receive a characteristic value from a server using a UUID.

The generic access profile (GAP) 45 as a layer newly implemented for the Bluetooth LE technology is used for selecting a role for communication among Bluetooth LE devices and control how multi profiles are actuated.

Further, the generic access profile (GAP) 45 is primarily used in device discovery, connection creation, and security procedure parts and defines a scheme for providing the information to the user and defines the type of the attribute.

① Service: It defines a basic operation of a device by a combination of behaviors related to data
② Include: It defines a relationship between services
③ Characteristics: It is a data value used in a server
④ Behavior: It is a format that may be read by a computer defined by a UUID (value type).

The LE profile 46 has a dependency on the GATT and is used mainly for Bluetooth LE devices. For example, the LE profile 46 includes Battery, Time, FindMe, Proximity, Time, Object Delivery Service, and the like; specific contents of the GATT-based profiles are as follows.

Battery: Battery information exchanging method
Time: Time information exchanging method
FindMe: Provision of alarm service according to distance
Proximity: Battery information exchanging method
Time: Time information exchanging method The generic attribute profile (GATT) 44 is operable as a protocol for describing how the attribute protocol 43 is used at the time of configuring the services. For example, the generic attribute profile (GATT) 44 is operable to regulate how ATT attributes are together grouped by the services and operable to describe features associated with the services.

Therefore, the generic attribute profile 44 and the attribute protocol (ATT) 43 may use the features in order to describe the status of the device and the services and describe how the features are associated with each other and how the features are used.

Hereinafter, the procedures of the Bluetooth low energy (BLE) technology will be described in brief.

The BLE procedures may be divided into a device filtering procedure, an advertising procedure, s scanning procedure, a discovering procedure, a connecting procedure, and the like.

Device Filtering Procedure

The device filtering procedure is a method for reducing the number of devices performing a response with respect to a request, indication, notification, and the like, in the controller stack.

When requests are received from all the devices, it is not necessary to respond thereto, and thus, the controller stack may perform control to reduce the number of transmitted requests to reduce power consumption.

An advertising device or scanning device may perform the device filtering procedure to limit devices for receiving an advertising packet, a scan request or a connection request.

Here, the advertising device refers to a device transmitting an advertisement event, that is, a device performing an advertisement and is also termed an advertiser.

The scanning device refers to a device performing scanning, that is, a device transmitting a scan request.

In the BLE, in a case in which the scanning device receives some advertising packets from the advertising device, the scanning device should transmit a scan request to the advertising device.

However, in a case in which a device filtering procedure is used so a scan request transmission is not required, the scanning device may disregard the advertising packets transmitted from the advertising device.

Even in a connection request process, the device filtering procedure may be used. In a case in which device filtering is used in the connection request process, it is not necessary to transmit a response with respect to the connection request by disregarding the connection request.

Advertising Procedure

The advertising device performs an advertising procedure to perform undirected broadcast to devices within a region.

At this time, undirected broadcast refers to broadcasting in all directions rather than in a specific direction.

On the other hand, directed broadcast refers to broadcasting in a specific direction. Undirected broadcast is performed without involving a connection procedure between an advertising device and a device in a listening state (in what follows, it is called a listening device).

The advertising procedure is used to establish a Bluetooth connection with an initiating device nearby.

Or, the advertising procedure may be used to provide periodical broadcast of user data to scanning devices performing listening in an advertising channel.

In the advertising procedure, all the advertisements (or advertisement events) are broadcast through an advertisement physical channel.

The advertising devices may receive scan requests from listening devices performing listening to obtain additional user data from advertising devices. The advertising devices transmit responses with respect to the scan requests to the devices which have transmitted the scan requests, through the same advertising physical channels as the advertising physical channels in which the scan requests have been received.

Broadcast user data sent as part of advertising packets are dynamic data, while the scan response data is generally static data.

The advertisement device may receive a connection request from an initiating device on an advertising (broadcast) physical channel. If the advertising device has used a connectable advertising event and the initiating device has not been filtered according to the device filtering procedure, the advertising device may stop advertising and enter a connected mode. The advertising device may start advertising after the connected mode.

Scanning Procedure

A device performing scanning, that is, a scanning device performs a scanning procedure to listen to undirected broadcasting of user data from advertising devices using an advertising physical channel.

The scanning device transmits a scan request to an advertising device through an advertising physical channel in order to request additional user data from the advertising device. The advertising device transmits a scan response as a response with respect to the scan request, by including additional user data which has requested by the scanning device through an advertising physical channel.

The scanning procedure may be used while being connected to other BLE device in the BLE piconet.

If the scanning device is in an initiator mode in which the scanning device may receive an advertising event and initiates a connection request. The scanning device may transmit a connection request to the advertising device through the advertising physical channel to start a Bluetooth connection with the advertising device.

When the scanning device transmits a connection request to the advertising device, the scanning device stops the initiator mode scanning for additional broadcast and enters the connected mode.

Discovering Procedure

Devices available for Bluetooth communication (hereinafter, referred to as "Bluetooth devices") perform an advertising procedure and a scanning procedure in order to discover devices located nearby or in order to be discovered by other devices within a given area.

The discovering procedure is performed asymmetrically. A Bluetooth device intending to discover other device nearby is termed a discovering device, and listens to discover devices advertising an advertising event that may be scanned. A Bluetooth device which may be discovered by other device and available to be used is termed a discoverable device and positively broadcasts an advertising event such that it may be scanned by other device through an advertising (broadcast) physical channel.

Both the discovering device and the discoverable device may have already been connected with other Bluetooth devices in a piconet.

Connecting Procedure

A connecting procedure is asymmetrical, and requests that, while a specific Bluetooth device is performing an advertising procedure, another Bluetooth device should perform a scanning procedure.

That is, an advertising procedure may be aimed, and as a result, only one device may response to the advertising. After a connectable advertising event is received from an advertising device, a connecting request may be transmitted to the advertising device through an advertising (broadcast) physical channel to initiate connection.

Hereinafter, operational states, that is, an advertising state, a scanning state, an initiating state, and a connection state, in the BLE technology will be briefly described.

Advertising State

A link layer (LL) enters an advertising state according to an instruction from a host (stack). In a case in which the LL is in the advertising state, the LL transmits an advertising packet data unit (PDU) in advertising events.

Each of the advertising events include at least one advertising PDU, and the advertising PDU is transmitted through an advertising channel index in use. After the advertising PDU is transmitted through an advertising channel index in use, the advertising event may be terminated, or in a case in which the advertising device may need to secure a space for performing other function, the advertising event may be terminated earlier.

Scanning State

The LL enters the scanning state according to an instruction from the host (stack). In the scanning state, the LL listens to advertising channel indices.

The scanning state includes two types: passive scanning and active scanning. Each of the scanning types is determined by the host.

Time for performing scanning or an advertising channel index are not defined.

During the scanning state, the LL listens to an advertising channel index in a scan window duration. A scan interval is defined as an interval between start points of two continuous scan windows.

When there is no collision in scheduling, the LL should listen in order to complete all the scan intervals of the scan window as instructed by the host. In each scan window, the LL should scan other advertising channel index. The LL uses every available advertising channel index.

In the passive scanning, the LL only receives packets and cannot transmit any packet.

In the active scanning, the LL performs listening in order to be relied on an advertising PDU type for requesting advertising PDUs and advertising device-related additional information from the advertising device.

Initiating State

The LL enters the initiating state according to an instruction from the host (stack).

When the LL is in the initiating state, the LL performs listening on advertising channel indices.

During the initiating state, the LL listens to an advertising channel index during the scan window interval.

Connection State

When the device performing a connection state, that is, when the initiating device transmits a CONNECT_REQ PDU to the advertising device or when the advertising device receives a CONNECT_REQ PDU from the initiating device, the LL enters a connection state.

It is considered that a connection is generated after the LL enters the connection state. However, it is not necessary to consider that the connection should be established at a point in time at which the LL enters the connection state. The only difference between a newly generated connection and an already established connection is a LL connection supervision timeout value.

When two devices are connected, the two devices play different roles.

An LL serving as a master is termed a master, and an LL serving as a slave is termed a slave. The master adjusts a timing of a connecting event, and the connecting event refers to a point in time at which the master and the slave are synchronized.

Hereinafter, packets defined in an Bluetooth interface will be briefly described. BLE devices use packets defined as follows.

Packet Format

The LL has only one packet format used for both an advertising channel packet and a data channel packet.

Each packet includes four fields of a preamble, an access address, a PDU, and a CRC.

When one packet is transmitted in an advertising physical channel, the PDU may be an advertising channel PDU, and when one packet is transmitted in a data physical channel, the PDU may be a data channel PDU.

Advertising Channel PDU

An advertising channel PDU has a 16-bit header and payload having various sizes.

A PDU type field of the advertising channel PDU included in the heater indicates PDU types defined in Table 1 below.

TABLE 1

| PDU Type | Packet Name |
|---|---|
| 0000 | ADV_IND |
| 0001 | ADV_DIRECT_IND |

TABLE 1-continued

| PDU Type | Packet Name |
|---|---|
| 0010 | ADV_NONCONN_IND |
| 0011 | SCAN_REQ |
| 0100 | SCAN_RSP |
| 0101 | CONNECT_REQ |
| 0110 | ADV_SCAN_IND |
| 0111-1111 | Reserved |

Advertising PDU

The following advertising channel PDU types are termed advertising PDUs and used in a specific event.

ADV_IND: Connectable undirected advertising event

ADV_DIRECT_IND: Connectable directed advertising event

ADV_NONCONN_IND: Unconnectable undirected advertising event

ADV_SCAN_IND: Scannable undirected advertising event

The PDUs are transmitted from the LL in an advertising state, and received by the LL in a scanning state or in an initiating state.

Scanning PDU

The following advertising channel DPU types are termed scanning PDUs and are used in a state described hereinafter.

SCAN_REQ: Transmitted by the LL in a scanning state and received by the LL in an advertising state.

SCAN_RSP: Transmitted by the LL in the advertising state and received by the LL in the scanning state.

Initiating PDU

The following advertising channel PDU type is termed an initiating PDU.

CONNECT_REQ: Transmitted by the LL in the initiating state and received by the LL in the advertising state.

Data Channel PDU

The data channel PDU may include a message integrity check (MIC) field having a 16-bit header and payload having various sizes.

The procedures, states, and packet formats in the BLE technology discussed above may be applied to perform the methods proposed in this disclosure.

FIG. 5 is a diagram illustrating an example of the structure of a GATT Profile of Bluetooth low energy.

From FIG. 5, it can be seen a structure for a profile data exchange of Bluetooth low energy.

Specifically, a generic attribute profile (GATT) defines a method of exchanging data using services or characteristics between Bluetooth LE devices.

In general, a peripheral device (e.g., sensor device) plays a role of a GATT server and has definition for services and characteristics.

In order to read or write data, a GATT client transmits a data request to a GATT server. All transactions are started in the GATT client, and responses are received from the GATT server.

A GATT-based operation structure used in Bluetooth LE is based on a profile, services or characteristics, and may form a vertical structure, such as FIG. 5.

The profile is configured with one or more services, and the service may be configured with one or more characteristics or other services.

The service functions to divide data in a logical unit, and may include one or more characteristics or other services. Each service has a 16-bit or 128-bit discriminator called a universal unique identifier (UUID).

The characteristic is the lowest unit in the GATT-based operation structure. The characteristic includes only one data, and has a 16-bit or 128-bit UUID like the service.

The characteristic is defined as values of various pieces of information, and requires one attribute in order to contain each piece of information. The characteristic may use several contiguous attributes.

The attribute consists of four elements, and has the following meaning.

handle: the address of an attribute

Type: the type of attribute

Value: a value of an attribute

Permission: access rights to an attribute

The disclosure proposes a method of measuring, by a sensor, human activities using the GATT-based operation structure of Bluetooth LE, storing the measured activities, and invoking, by a client, stored information from the sensor.

FIG. 6 is a flowchart illustrating a method of forming a connection using Bluetooth low energy (LE) between devices.

As shown in FIG. 6, for a Bluetooth LE connection between a first device 300 and a second device 400, the first device 300 transmits an advertising message to the second device (S6010).

The advertising message is used to provide its own information to another device using Bluetooth LE as described above, and may include various pieces of information, such as service information provided by a device, and user information.

After confirming the information included in the advertising message transmitted by the first device 300, the second device 400 transmits a connection request message for requesting a Bluetooth LE connection to the first device 300 (S6020). The first device 300 and the second device 400 form a Bluetooth low energy (LE) connection (S6030).

FIG. 7 is a diagram illustrating a block diagram of a voice recognition service system according to an embodiment of the disclosure.

Referring to FIG. 7, a voice client 7010 may receive a user's voice through an input device, such as a microphone, may transmit the user's voice to a voice manager 7020, and may output a voice output, received from the voice manager 7020, to an output device, such as a headset or a speaker. In the disclosure, the voice client 7010 may be referred to as a voice agent.

In this case, the voice client 7010 may be connected to the voice manager 7020 through Bluetooth LE communication, and may exchange Bluetooth LE audio and/or control data through the connection.

The voice manager 7020 may transmit, to a voice recognition server 7030, a voice command received from the voice client 7010, and may transmit, to the voice client 7010, a voice response received from the voice recognition server 7030. In the disclosure, the voice manager 7020 may be referred to as a voice gateway.

The voice recognition server 7030 may generate a voice response by analyzing a voice input received from the voice manager 7020. Furthermore, the voice recognition server 7030 may transmit the generated voice response to the voice manager 7020.

A target device 704 refers to a device controlled through a voice input. The target device 704 may use a separate cloud server in order to generate a control command.

FIG. 8 is a diagram for describing a problem occurring in the existing voice recognition service.

Referring to FIG. 8, it is assumed that a device connected to a voice client through Bluetooth LE supports three voice recognition services through a first voice manager, a second voice manager, and a third voice manager.

Each of the voice managers may be connected a voice recognition server in a wireless or wired manner. The voice recognition server may be implemented as a single device along with a voice manager or may be implemented as a separate device.

In the existing voice recognition service, a main device (e.g., a smartphone or a home hub) having a voice recognition function and a remote device (e.g., a headset or a speaker) connected through Bluetooth communication, that is, a voice client, can use only one of several voice recognition services supported by the main device.

Recently various services are used in the market with the supply of voice recognition services, but only one service supported by a smartphone connected to a voice client, such as a headset or a speaker, can be used in the voice client.

If a remote device selects and invokes various voice recognition services, there is a problem in that the remote device (i.e., voice client) having insufficient resources must memorize wake words for all voice recognition services.

In the disclosure, the wake word may be referred to as a trigger voice or a trigger command.

FIG. 9 is a diagram for describing a problem occurring in the existing voice recognition service.

Referring to FIG. 9, a voice client obtains wake words from voice managers (S9010). That is, the voice client may obtain each wake word from each voice manager in order to invoke a voice recognition service to be used. In this case, an Advertise extension or GATT profile may be used.

Thereafter, the voice client hears a user's voice in order to detect (or identify) any one of the plurality of obtained wake words, and may identify (or receive) a specific wake word from the user's voice (S9020).

Furthermore, if the voice client hears any one of stored wake words from a user, it invokes a corresponding voice manager and starts a voice recognition service between the voice client and the selected voice manager (S9030).

That is, the voice client may transmit or receive audio and/or control data, including a voice command input or output, through an audio channel formed between the voice client and the selected voice manager.

As described above, according to the existing method, in general, a voice client must store a plurality of wake words although it has a low memory.

Furthermore, there are problems in that the voice client continues to listen to a user voice in order to distinguish between a plurality of wake words and consumption power is inevitably increased as the number of wake words is increased.

FIG. 10 is a diagram illustrating a block diagram of a voice recognition service system according to an embodiment of the disclosure.

In an embodiment of the disclosure, a voice client can indirectly invoke a specific voice recognition service to be used among a plurality of voice recognition services through a voice gateway. Hereinafter, in the disclosure, a voice gateway and a plurality of voice managers may be implemented as a single device or may be implemented as independent and separate devices.

Referring to FIG. 10, a voice gateway may integrate and manage a plurality of voice managers. It is assumed that the voice gateway connected to a voice client through Bluetooth LE supports (or manages) three voice recognition services through a first voice manager, a second voice manager, and a third voice manager.

Each of the voice managers may be connected each of voice recognition servers in a wireless or wired manner. The voice recognition server may be implemented as a single device along with the voice manager or may be implemented as a separate device.

One wake word (i.e., local wake word) may be configured in the voice client, and the voice client may identify only one wake word in a user's voice.

That is, the user may activate a voice recognition service (or voice recognition session) between the voice client and the voice gateway through the local wake word of the voice client.

In this case, for the activation of a specific voice recognition service, the voice client or the user may invoke a voice manager using the following method.

- previously register a representative voice manager with the voice gateway and use the representative voice manager
- a user selects and invokes a given voice manager through the voice gateway (e.g., a voice manager corresponding to a wake word spoken by the user after the local wake word)

First, a method of previously registering a representative voice manager with a voice gateway and using the representative voice manager is described.

FIG. 11 is an embodiment to which the disclosure is applied and is a diagram for describing a method of invoking any one of a plurality of voice recognition services through Bluetooth LE communication.

Referring to FIG. 11, each of voice managers transmits its wake word to a voice gateway. The voice gateway selects a representative invoking voice recognition service (S11010).

In this case, the voice gateway may receive an input from a user and select (or determine) the representative invoking voice recognition service among a plurality of voice recognition services. For example, the voice gateway may register a second voice manager having a wake word "Bob" as a representative invoking voice recognition service.

The user invokes the wake word of a voice client (S11020). That is, the voice client identifies the wake word pre-configured in the voice client among the user's voice. For example, the user may configure a wake word called "Hey, LG" in the voice client, and may request the activation of a voice recognition service by speaking "Hey, LG."

Furthermore, in one embodiment, a user may register, as the wake word of a voice client, the wake word of a voice manager registered as a representative invoking voice recognition service. That is, for example, the user may request the activation of a voice recognition service by speaking "Hey Bob" not "Hey LG" depending on a configuration.

The voice client transmits, to the voice gateway, a request message to request the start of a voice recognition service (or voice recognition session) (S11030).

The voice gateway transmits, to the second voice manager supporting the representative voice recognition service determined in step S11010, a request message to request the start of the voice recognition service (S11040). The voice recognition service is executed between the voice client and the second voice manager supporting the representative voice recognition service (S11050).

For example, the second voice manager may request a voice command from the voice client through a voice output. The voice client may transmit a voice input (or voice command) to the second voice manager as a response to the request. Thereafter, the second voice manager may transmit the voice output to the voice client as a response to the voice input of the voice client.

FIG. 12 is an embodiment to which the disclosure is applied and is a diagram for describing a method of invoking any one of a plurality of voice recognition services through Bluetooth LE communication.

Referring to FIG. 12, a voice gateway registers (or receives or obtains) wake words from respective voice managers (S12010). For example, a first voice manager may have a wake word "Alice", a second voice manager may have a wake word "Bob", and a third voice manager may have a wake word "Charlie." Each voice manager may register each wake word with the voice gateway through step S12010.

A user invokes the wake word of a voice client (S12020). That is, the voice client identifies a wake word pre-configured in the voice client among the user's voice. For example, the user may previously configure a wake word "Hey, LG" in the voice client, and may request the activation of a voice recognition service by speaking "Hey, LG."

The voice client transmits, to the voice gateway, a request message to request the start of a voice recognition service (or voice recognition session) (S12030).

The voice gateway may wait so that the user can select a desired voice manager to be invoked (S12040), and may transmit, to the voice client, a notification message that notifies waiting for the selection of a voice recognition service (S12050). That is, the voice gateway may transmit, to the voice client, a request message to request the selection of a specific voice recognition service among voice recognition services supported by the plurality of voice managers.

The voice client may output, to the user, a prompt sound to request the selection of a voice manager or voice recognition service (S12060).

The user invokes the wake word of a desired voice manager to be invoked (S12070), and transmits the wake word to the voice gateway (S12080).

The voice gateway selects (or identifies) the second voice manager, that is, a voice manager corresponding to the received wake word (S12090).

The voice gateway transmits, to the second voice manager supporting the representative voice recognition service determined at step S12090, a request message to request the start of the voice recognition service (S12100). The voice recognition service is executed between the voice client and the second voice manager, that is, the representative voice recognition service (S12110).

For example, the second voice manager may request a voice command from the voice client through a voice output. The voice client may transmit a voice input (or voice command) to the second voice manager as a response to the request. Thereafter, the second voice manager may transmit, to the voice client, a voice output as a response to the voice input of the voice client.

FIG. 13 is an embodiment to which the disclosure is applied and is a diagram for describing a method of discovering a plurality of voice recognition services and obtaining a wake word.

Referring to FIG. 13, a voice client may transmit, to a voice gateway, a discovery request message to request discovery for the wake words of voice managers through a Bluetooth communication connection. For a predetermined specific discovery time, the voice client may receive wake words from the voice managers.

Furthermore, the voice gateway may transmit, to the voice client, a notification message that notifies the received wake words.

For example, if the voice gateway receives wake words "Alice" and "Bob" from a first voice manager and a second voice manager, the voice gateway may transmit, to the voice client, a notification message that notifies the reception of the wake words.

Thereafter, the voice gateway may continue to discover voice managers for a specific discovery time in background, and may transmit, to the voice client, a notification message that notifies an additionally discovered voice manager.

FIG. 14 is an embodiment to which the disclosure is applied and is a diagram for describing a method of invoking any one of a plurality of voice recognition services through Bluetooth LE communication.

Referring to FIG. 14(a), when a voice client (i.e., remote device) detects a wake word (e.g., "Hey, LG") pre-configured in the voice client among a user's voice, it transmits, to a voice gateway (i.e., main device), a voice recognition (VR) command to request the execution of a voice recognition service.

The voice gateway selects a voice manager corresponding to "Bob" configured as a representative voice manager, and transmits a voice output to the voice client. In this case, the voice client may output a voice (e.g., "Hey, user") received from the user.

Thereafter, the voice client transmits, to the voice gateway, a voice command (or voice input) received from the user. The voice gateway may transmit the voice output to the voice client again.

Referring to FIG. 14(b), when a voice client (i.e., remote device) detects a wake word (e.g., "Hey, LG") pre-configured in the voice client among a user's voice, it transmits, to a voice gateway (i.e., main device), a voice recognition (VR) command to request the execution of a voice recognition service. Furthermore, subsequently, the voice client transmits a voice input (e.g., "Hey, Bob") to select a specific voice manager (or voice recognition service).

The voice gateway selects a voice manager corresponding to "Bob" configured as a representative voice manager, and transmits a voice output to the voice client. In this case, the voice client may output a voice (e.g., "Hey, user") received from the user.

Thereafter, the voice client transmits, to the voice gateway, a voice command (or voice input) received from the user. The voice gateway may transmit the voice output to the voice client again.

FIG. 15 is an embodiment to which the disclosure is applied and is a diagram for describing a method of invoking any one of a plurality of voice recognition services through Bluetooth LE communication.

A first device receives, from a second device connected thereto through Bluetooth communication, a first request message to request the start of a voice recognition service (S15010). In this case, the first request message may be generated by the generation of a first wake word pre-configured in the second device.

The first device executes a voice gateway connected to a plurality of voice managers as a response to the first request message (S15020).

The first device executes a voice recognition service between the second device and a first voice manager determined by the voice gateway among the plurality of voice managers (S15030).

As described above, the first device may execute a voice recognition service between the second device and a first voice manager pre-configured in the voice gateway among the plurality of voice managers.

Furthermore, as described above, the first device may receive, from the second device, a second wake word corresponding to any one of the plurality of voice managers.

Furthermore, as described above, the first device may execute a voice recognition service between the second device and a first voice manager corresponding to a second wake word, and may obtain, from the plurality of voice managers, wake words corresponding to the plurality of voice managers, respectively.

Furthermore, as described above, the first device may transmit, to the second device, a second request message to request the selection of a specific voice recognition service among voice recognition services supported by the plurality of voice managers.

Furthermore, as described above, the first device may transmit a third request message that the voice gateway requests the execution of a voice recognition service from a first voice manager corresponding to a second wake word.

Furthermore, as described above, the first device may receive, from the second device, a voice command related to a voice recognition service supported by the first voice manager.

Furthermore, as described above, the first device may transmit, to the second device, a voice output signal related to a voice recognition service supported by the first voice manager.

The aforementioned embodiments are achieved by combination of structural elements and features of the present invention in a predetermined manner. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

INDUSTRIAL APPLICABILITY

The aforementioned preferred embodiments of the disclosure have been disclosed for illustrative purposes, and those skilled in the art may improve, change, substitute, or add various other embodiments without departing from the technical spirit and scope of the disclosure disclosed in the attached claims.

The invention claimed is:

1. A method performed by a first device in order to invoke a voice recognition service in a wireless communication system using a Bluetooth low energy technology, the method comprising:
   receiving, from a second device connected to the first device through Bluetooth communication, a first request message to request a start of a voice recognition service, wherein the first request message is generated by a generation of a first wake word pre-configured in the second device;
   executing a voice gateway connected to a plurality of voice managers as a response to the first request message; and
   executing the voice recognition service between the second device and a first voice manager determined by the voice gateway among the plurality of voice managers,
   wherein executing the voice recognition service comprises:
   receiving, from the second device, a second wake word corresponding to any one of the plurality of voice managers; and
   executing a voice recognition service between the second device and the first voice manager corresponding to the second wake word.

2. The method of claim 1,
   wherein executing the voice recognition service comprises executing a voice recognition service between the second device and the first voice manager pre-configured in the voice gateway, among the plurality of voice managers.

3. The method of claim 1,
   wherein executing the voice recognition service comprises obtaining, from the plurality of voice managers, wake words corresponding to the plurality of voice managers, respectively.

4. The method of claim 3,
   wherein executing the voice recognition service further comprises transmitting, to the second device, a second request message to request a selection of a specific voice recognition service of voice recognition services supported by the plurality of voice managers.

5. The method of claim 1,
   wherein executing the voice recognition service further comprises transmitting, by the voice gateway, a third request message to request an execution of the voice recognition service to the first voice manager corresponding to the second wake word.

6. The method of claim 1, further comprising:
   receiving, from the second device, a voice command related to the voice recognition service supported by the first voice manager.

7. The method of claim 6, further comprising:
   transmitting, to the second device, a voice output signal related to the voice recognition service supported by the first voice manager.

8. A first device in a method of invoking a voice recognition service in a wireless communication system using a Bluetooth low energy technology, the first device comprising:
   a transceiver for transmitting or receiving a signal to or from an external device in a wired and/or wireless manner; and
   a processor functionally connected to the transceiver, wherein the processor is configured to:
   receive, from a second device connected to the first device through Bluetooth communication, a first request message to request a start of a voice recognition service, wherein the first request message is generated by a generation of a first wake word pre-configured in the second device;

execute, as a response to the first request message, a voice gateway connected to a plurality of voice managers; and execute the voice recognition service between the second device and a first voice manager determined by the voice gateway among the plurality of voice managers, wherein the processor is configured to execute the voice recognition service by:

receiving, from the second device, a second wake word corresponding to any one of the plurality of voice managers; and executing a voice recognition service between the second device and the first voice manager corresponding to the second wake word.

* * * * *